(12) United States Patent
Patel

(10) Patent No.: US 7,652,268 B2
(45) Date of Patent: Jan. 26, 2010

(54) GENERAL PURPOSE, HIGH ACCURACY DOSIMETER READER

(75) Inventor: Gordhanbhai N. Patel, Middlesex, NJ (US)

(73) Assignee: JP Laboratories, Inc, Middlesex, NJ (US)

( * ) Notice: Subject to any disclaimer, the term of this patent is extended or adjusted under 35 U.S.C. 154(b) by 195 days.

(21) Appl. No.: 11/699,520

(22) Filed: Jan. 29, 2007

(65) Prior Publication Data

US 2008/0023647 A1 Jan. 31, 2008

Related U.S. Application Data

(60) Provisional application No. 60/763,797, filed on Jan. 31, 2006.

(51) Int. Cl.
*H05B 33/00* (2006.01)

(52) U.S. Cl. .................. 250/484.5; 250/472.1

(58) Field of Classification Search .... 250/472.1–484.5
See application file for complete search history.

(56) References Cited

U.S. PATENT DOCUMENTS

| | | | |
|---|---|---|---|
| 3,894,238 A | 7/1975 | Cox et al. | ................. 250/484.3 |
| 3,999,946 A | 12/1976 | Patel et al. | ..................... 422/56 |
| 5,298,728 A | 3/1994 | Elliott et al. | ................. 235/463 |
| 5,382,783 A | 1/1995 | Bremer | ........................ 235/462 |
| 5,408,535 A | 4/1995 | Howard, III et al. | ........... 382/1 |
| 5,433,214 A | 7/1995 | Brehm et al. | ................ 128/760 |
| 5,637,876 A * | 6/1997 | Donahue et al. | ......... 250/474.1 |
| 5,701,181 A | 12/1997 | Boiarski | ..................... 356/446 |
| 5,770,393 A | 6/1998 | Dalmasso et al. | ............. 435/31 |
| 5,777,341 A | 7/1998 | Seiwatz et al. | ........... 250/474.1 |
| 5,834,626 A | 11/1998 | DeCastro et al. | ............. 73/23.3 |
| 5,849,594 A | 12/1998 | Balderson et al. | ........... 436/133 |
| 5,916,816 A | 6/1999 | Read | .......................... 436/166 |
| 6,176,197 B1 | 1/2001 | Thompson | ................... 116/217 |

(Continued)

FOREIGN PATENT DOCUMENTS

CA 2223671 8/1999

(Continued)

OTHER PUBLICATIONS

International Search Report, PCT/US2007/002574, Datta, Jul. 23, 2007.

*Primary Examiner*—David P Porta
*Assistant Examiner*—Casey Bryant

(57) ABSTRACT

A general purpose high accuracy dosimeter reader, 80, for determination of a treatment condition, based on comparison of an image of treated dosimeter, 111, with a series of images of pre-treated dosimeter, 114, is disclosed. A dosimeter undergoes noticeable changes, such as a color change upon treatment with certain materials, such as toxic gases and processes, such as ionizing radiation and sterilization is pretreated. The dosimeter is imaged with an imaging device, 115, such as charge-coupled device camera and images of the dosimeter or the changes, e.g., color change, are stored in an information storage device, 118. In order to determine the treatment condition, the treatment dosimeter is imaged and the image is compared with the series of pre-treated images of the dosimeter using software. The closest match of the treated dosimeter with the pre-treated and pre-imaged dosimeter would indicate the treatment conditions. The process and device can be used for almost any indicating device, process and treatment.

38 Claims, 7 Drawing Sheets

STORED IMAGES

READ IMAGE

U.S. PATENT DOCUMENTS

| | | | |
|---|---|---|---|
| 6,232,610 B1 | 5/2001 | Pageau et al. | 250/474.1 |
| 6,267,242 B1 | 7/2001 | Nagata et al. | 206/459.1 |
| 6,268,602 B1 | 7/2001 | Seiwatz et al. | 250/252.1 |
| 6,285,031 B1 | 9/2001 | Listl | 250/474.1 |
| 6,296,187 B1 | 10/2001 | Shearer | 235/462.41 |
| 6,336,964 B1 | 1/2002 | Omatsu et al. | 106/31.44 |
| 6,361,962 B1 | 3/2002 | Lentini et al. | 435/29 |
| 6,435,128 B2 | 8/2002 | Qiu et al. | 116/207 |
| 6,436,347 B1 | 8/2002 | Cedeon | 422/56 |
| 6,436,716 B1 | 8/2002 | Wu | 436/128 |
| 6,472,214 B2 | 10/2002 | Patel | 436/2 |
| 6,488,890 B1 | 12/2002 | Kirckof | 422/56 |
| 6,504,161 B1 | 1/2003 | Jackson et al. | 250/474.1 |
| 6,545,705 B1 | 4/2003 | Sigel et al. | 348/157 |
| 6,685,094 B2 | 2/2004 | Cameron | 235/468 |
| 6,713,298 B2 | 3/2004 | McDevitt et al. | 435/287.8 |
| 6,716,393 B2 | 4/2004 | Lappe et al. | 422/68.1 |
| 6,717,154 B2 | 4/2004 | Black et al. | 250/393 |
| 6,770,487 B2 | 8/2004 | Crosby | 436/518 |
| 6,803,956 B1 | 10/2004 | Hirono | 348/272 |
| 6,810,137 B2 | 10/2004 | Jones et al. | 382/135 |
| 6,826,313 B2 * | 11/2004 | Robar et al. | 382/287 |
| 2005/0218339 A1 * | 10/2005 | Ishidoya | 250/484.2 |
| 2006/0145091 A1 | 7/2006 | Patel | 250/474.1 |

FOREIGN PATENT DOCUMENTS

| | | |
|---|---|---|
| EP | 1712932 A1 * | 10/2006 |
| WO | 9717595 | 5/1997 |
| WO | 00/37966 | 6/2000 |
| WO | 2004/017095 | 2/2004 |
| WO | 2004077098 | 10/2004 |

\* cited by examiner

| GY | GY |
|---|---|
| ☐ 0.00 | ▨ 0.75 |
| ▨ 0.02 | ▨ 1.00 |
| ▨ 0.05 | ▨ 1.25 |
| ▨ 0.07 | ▨ 1.50 |
| ▨ 0.10 | ▨ 1.75 |
| ▨ 0.15 | ▨ 2.00 |
| ▨ 0.20 | ▨ 2.50 |
| ▨ 0.25 | ▨ 3.00 |
| ▨ 0.30 | ▨ 4.00 |
| ▨ 0.40 | ▨ 5.00 |
| ▨ 0.50 | |
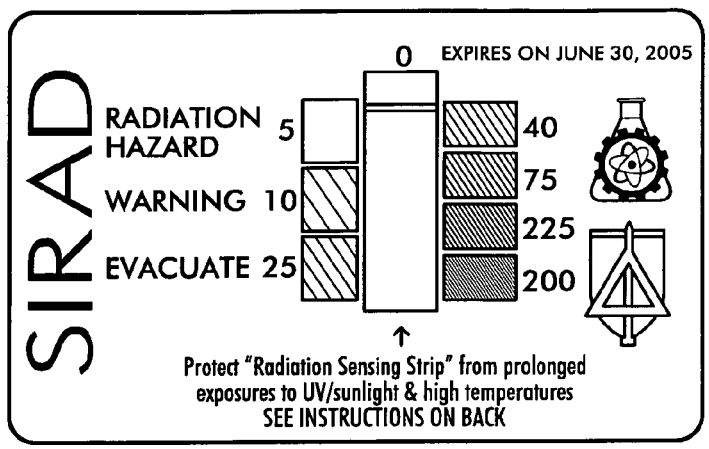
UNIRRADIATED 2-GY SIRAD BADGE
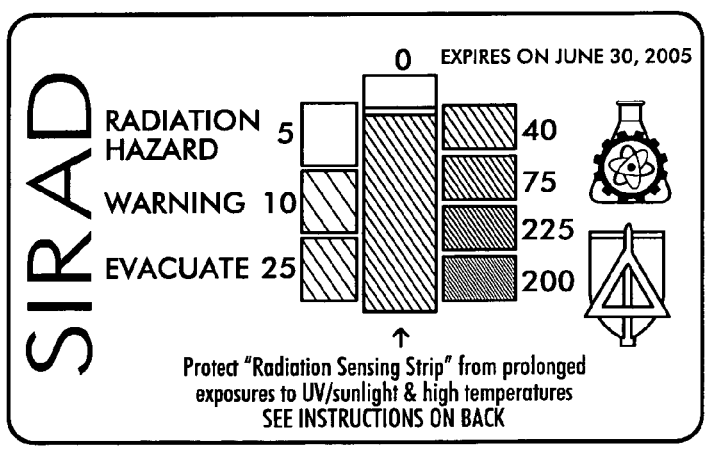
2-GY SIRAD EXPOSED TO 0.4 GY
Fig.1

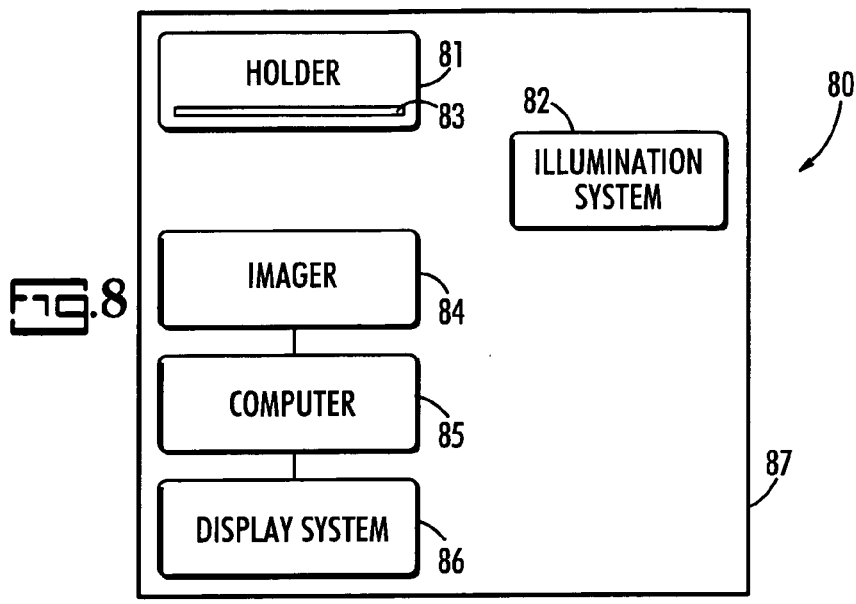
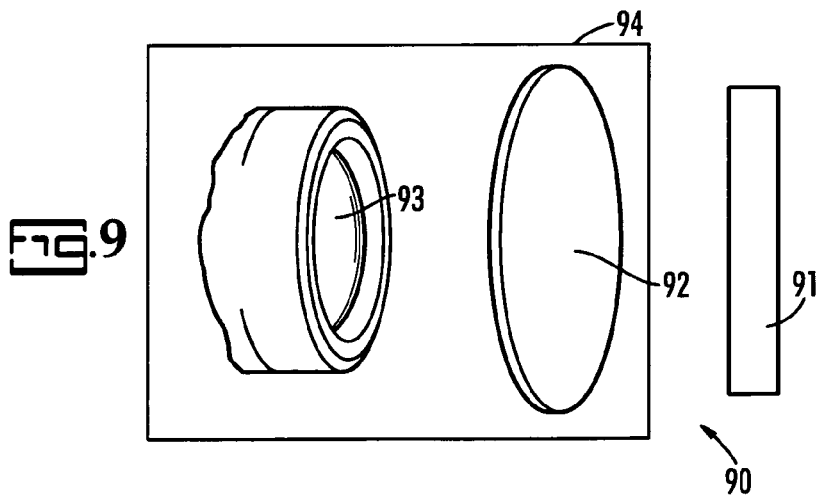
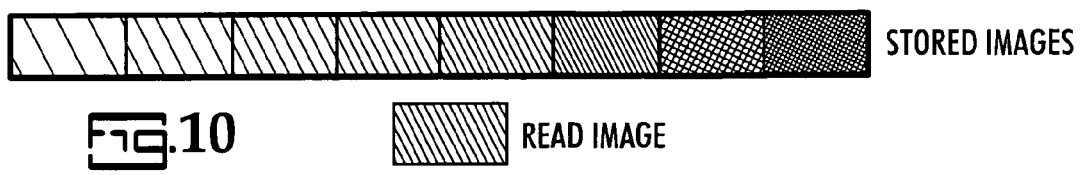

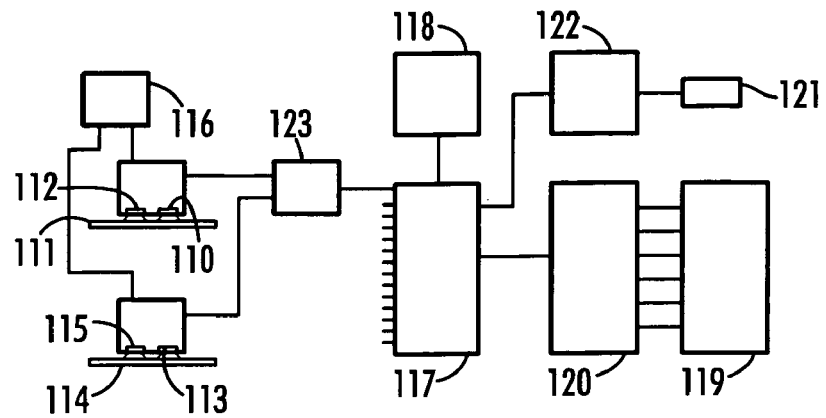
FIG.11
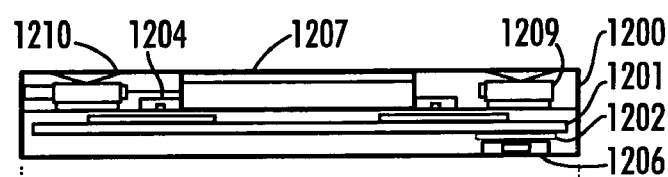
FIG.12
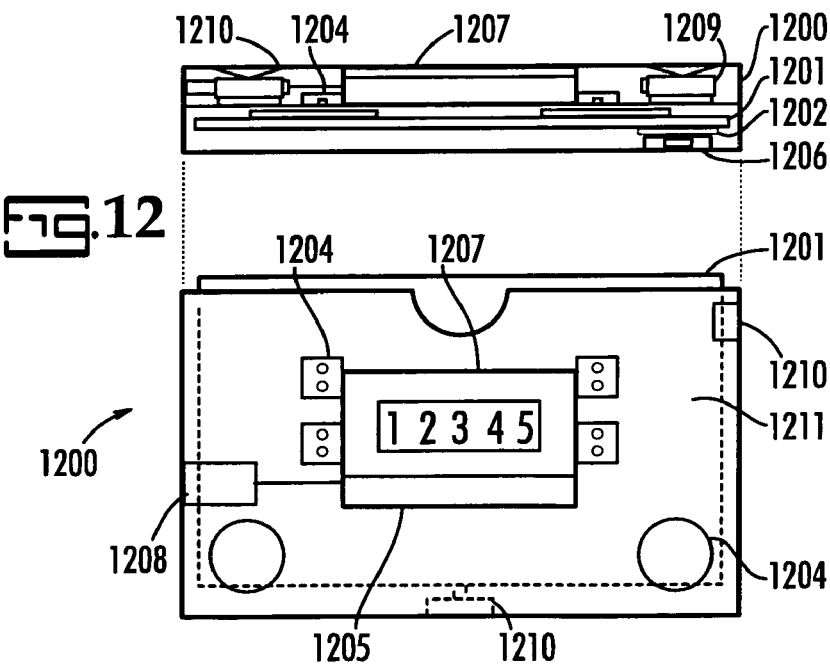
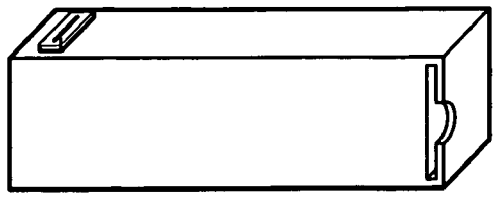
FIG.13

GENERAL PURPOSE, HIGH ACCURACY DOSIMETER READER

CROSS-REFERENCE TO RELATED APPLICATIONS

The present application claims priority to U.S. Provisional Patent Application No. 60/763,797 filed Jan. 31, 2006.

FIELD OF THE INVENTION

This invention relates to a method and device for monitoring a dosage using a scanning device, such as a CCD camera. More particularly, this invention relates to a general purpose dosimeter reader for determination of a radiation dosage, based on comparison of an image of treated dosimeter with a series of images of a pre-treated dosimeter.

BACKGROUND OF THE INVENTION

A large number of indicators, dosimeters, monitors, detectors, sensors and the like, especially those which undergo a change in color or fluorescence, are developed for monitoring presence and concentration of variety of materials, such as toxic chemicals and processes, such as sterilization of medical supplies with steam. This type of indicators, dosimeters, monitors, sensors, detectors and the like, individually or collectively, are referred herein as indicator(s) or dosimeter(s).

Many patents have been issued on color changing indicators, monitors, detectors, and dosimeters for monitoring a variety of processes and materials. They include indicators for chemicals, pH, sterilization, humidity/moisture, time, time-temperature, temperature and radiation. Many of these indicators are available commercially. Some representative examples of recent patents include: freeze indicators in U.S. Pat. No. 6,472,214 to Patel; hydrogen peroxide indicator in U.S. Pat. No. 6,267,242 to Nagata et al.; carbon dioxide indicators in U.S. Pat. No. 6,436,347 to Cedeon and U.S. Pat. No. 5,849,594 to Balderson et al.; aldehyde strip indicators in U.S. Pat. No. 6,436,716; toxin indicators in U.S. Pat. No. 6,361,962 to Lentini et al.; ozone indicators in U.S. Pat. No. 6,336,964 Omatsu et al.; temperature indicators in U.S. Pat. No. 6,176,197 to Thompson; sterilization indicators in U.S. Pat. No. 5,916,816; breath, air and gas vapor indicators in U.S. Pat. No. 5,834,626 to De Castro et al.; biological indicators in U.S. Pat. No. 5,770,393 to Dalmasso et al.; fat and moisture indicators in U.S. Pat. No. 5,433,214 to Brehm et al.; time-temperature indicator in U.S. Pat. No. 6,435,128 to Qiu et al.; UV radiation indicator in U.S. Pat. No. 6,504,161 to Jackson et al, and high energy indicators, such as X-radiation, in U.S. Pat. No. 6,504,161 to Jackson et al.

Reagent test strips are widely used in clinical chemistry. Usually, this analysis involves a color comparison between the reacted test pad/strip and a color standard or scale. In this way, reagent test strips assist physicians in diagnosing the existence of diseases and other health problems.

Reflected or transmitted light comparisons made with the naked eye can lead to imprecise measurement. Instruments, such as optical densitometers and spectrophotometers can be employed for reading the indicators. These instruments determine the color change of the indicator, but only with limited resolution and precision. This is mainly because optical density or spectra are recorded only of a small area of the strip/dosimeter. For higher accuracy, the whole area of the indicator should be monitored. This can be best done by using a scanning device, such as CCD (charge-coupled device) camera. There is no report on use of CCD camera or an optical scanner for reading the dosimeter and determining the treatment condition by comparing with a series of images of pre-treated dosimeter stored in a computer.

Scanning devices, such as a CCD camera, are used for identification of people by recording their finger prints, faces and iris and comparing the scanned images with those stored in the database. There is no report on the use of similar system for reading the dosimeter and determining the treatment condition by comparing with a series of images of pre-treated dosimeter using software.

Bar codes are used in a wide variety of applications for retrieving information, such as the price of an object. In this respect, bar code scanners are of widespread use in grocery stores and department stores, for both inventory control and for point-of-sale transactions.

A bar code normally includes several bar code characters. A bar code character is a group of lines (bars) and spacings that represent a single number or letter. A bar code symbol is a collection of several bar code characters which represent an identification of a particular object. The lines of the bar code can vary, for example, in a range from about ⅛" to 1" in height, and from about 1 to 50 mils in thickness. The spacings between the lines of the bar code symbol may be of various widths, with the variations in the spacing being one indication of the type of bar code characters making up the bar code symbol.

Bar codes are scanned to transform the graphic symbol elements into electrical signals, which are then decoded into characters. A scanning system uses a light source, typically a laser, which is directed to the symbol or bar code by a lens or other optical components. The scanner functions by repetitively scanning the light beam in a path or series of paths across the symbol. Scanning systems also include a sensor or photodetector which detects light reflected from the symbol. A portion of the reflected light is detected and converted into an electrical signal, and electronic circuitry or software decodes the electrical signal into a digital representation. The symbol is decoded according to the coding technique used, e.g., the Uniform Product Code (UPC) on many supermarket items.

Another conventional method for collecting return light from the bar code label is by the use of an array (commonly known as a charge-coupled device or CCD) of optical detectors connected to an analog shift register. In such a method, as with a scanning laser, an electrical signal is generated having amplitude determined by the intensity of the collected light. In either the scanning laser method or the CCD method, the amplitude of the electrical signal has one level for dark bars and another level for light spaces. As the bar code label is scanned, positive-going and negative-going transitions in the electrical signal occur, signifying transitions between bars and spaces. Techniques are known for detecting edges of bars and spaces by detecting the transitions of the electrical signal. One such technique is described in U.S. Pat. No. 5,382,783, issued to Edward Bremer. Other techniques are described in U.S. Pat. No. 5,298,728, to Randy Elliott et al. Techniques are also known for determining the widths of bars and spaces based on the relative location of the detected edges and decoding the information represented by the bar code.

U.S. Pat. No. 5,637,876 describes a radiation dosimeter, which is exemplary for use in determining a level of radiation to which a patient is subjected during radiation treatment, which comprises a substrate provided with a layer of radiation sensitive material. The radiation sensitive material has an optical density which varies systematically in accordance with the degree of radiation exposure. The dosimeter may take the form of a card or a flexible substrate which is positionable on the patient or other irradiation subject and which is also positionable in, or slidable through a slot in, a dose reader which includes a reflection or transmission densitometer.

A fiber optic diffuse light reflectance sensor is disclosed in U.S. Pat. No. 5,701,181 to Boiarski et al. The sensor employs illumination optical fibers to carry light emitted from a high-intensity, narrow bandwidth LED to a baffle in a readhead where the optical fibers reflect the light off of a reagent test strip. The illumination optical fibers are randomly oriented to create a more uniform light source. The light is reflected off of a pad on a reagent test strip to detect the presence of non-hemolyzed trace and hemolyzed occult blood. The reflected light must pass through another baffle to a bi-convex lens where it is focused onto a detection bundle of optical fibers. The detection bundle is optically coupled with a CCD, where the optical signal is converted to an electrical one for processing and analysis.

A method and associated apparatus for monitoring exposure to radiation, with compensation for temperature variation of a sensor and variations in the amount of radiation sensitive material in a dosimeter used in the method is disclosed in U.S. Pat. No. 6,285,031 to Carl Listl. The method utilizes a radiation dosimeter having a layer of radiation sensitive material on a substrate, the radiation sensitive material having an optical absorbance which varies in accordance with degree of radiation exposure and wavelength and which also varies in dependence on temperature. The method comprises exposing the layer of radiation sensitive material to a dose of radiation, optically measuring a spectral absorbance of the exposed layer of radiation sensitive material within a range of wavelengths, examining the measured spectral absorbance of the exposed layer of radiation sensitive material to determine an absorbance coordinate and a wavelength coordinate of a predetermined point on a spectral absorbance curve of the exposed layer of radiation sensitive material, and determining a radiation dose value associated with the absorbance coordinate and the wavelength coordinate. Generally, the radiation dose value is determined by consulting a table of absorbance and wavelength coordinates with associated dose values which have been previously measured for a batch of the radiation sensitive material, the batch having a uniform absorbance coefficient and a common concentration of the radiation sensitive material. The method can automatically compensate for variations in the amount of radiation sensitive material by adjusting the absorbance value of the radiation sensitive material by a measured value of absorbance in the radiation impervious substance.

A bar code scanning system for a conveyor system, including a CCD camera, that writes data to a memory is disclosed in U.S. Pat. No. 6,296,187 to Franks Shearer. Data is stored in the memory as a two-dimensional image at periodic time frames based on scanning by the CCD camera. Data is written out of the memory by a controller to create a virtual X-scan pattern that can be read and decoded by a decoder that is configured to decode X-scan patterns. Alternatively, the memory can be configured as a first memory region for receiving even pixel data and a second memory region for receiving odd pixel data.

U.S. Pat. No. 6,810,137 to Jones et al discloses a document processing system comprising an input receptacle for receiving documents. A transport mechanism receives the documents from the input receptacle and transports the documents past a full image scanner and a discrimination unit. An output receptacle receives the documents from the transport mechanism after being transported past the full image scanner and the discrimination unit. The full image scanner includes a means for obtaining a full video image of the documents, a means for obtaining an image of a selected area of the documents, and a means for obtaining information contained in the selected area of the document. The discrimination unit includes a means for determining the authenticity of the document. A system controller directs the flows of documents over the transport mechanism.

U.S. Pat. No. 6,803,956 describes a color-recognition camera comprising a red-green-blue CCD-imaging device that provides an analog RGB-video signal. A set of three analog-to-digital converters convert the analog RGB-video signal into a digital RGB-video signal. A digital comparator tests the digital RGB-video signal pixel-by-pixel for a match against a color setpoint. If a match occurs, a pixel with a particular color represented by the color setpoint has been recognized and a "hit" is output. A pixel address counter provides a pixel address output each time a "hit" is registered. The number of hits per video frame are accumulated, and a color-match area magnitude value is output for each frame. Alternatively, neural networks are used to indicate hits when a pixel in the video image comes close enough to the color setpoint value. Just how close can be "learned" by the neural network.

A reader for monitoring color change of a dipstick is disclosed in CA 2,223,671. A reader is either a computer controlled or a stand-alone instrument. The reader uses a CCD (charge-coupled device) camera to capture the image for processing. The reader uses computer or stand alone chips for digital image processing. The reader can read dipstick format, cassette format, and other membrane based formats as well as ELISA format diagnostic test kits. Modes can be selected for different test format and types of tests. The reader can read one test or multiple tests at a time. The image handling procedures of the reader are as following: (a) the test kit(s) is/are placed on the reading window; (b) digital image(s) will be taken by one or more CCD camera(s); (c) computer or microprocessor will manipulate the image; (d) the color intensity and location of a marker on the test will be recorded; (e)clinical results will be calculated based on the preset formulators and (f) hard copy results will be print out by printer.

A method for creating a volumetric data set representing a three-dimensional distribution, such as a dose distribution produced by a radiosurgery system, using a plurality of stacked sensors to obtain two-dimensional cross sectional images of the distribution is disclosed in U.S. Pat. No. 6,826,313 to Robar et al. The images are optically scanned in a scanner to obtain digitized two-dimensional images which can be processed by software. Each of the sensors, which may be, for example, a sheet of X-ray sensitive film, is marked with a visible fiducial mark. The software locates images of the fiducial marks in the digitized images. The locations of the fiducial marks indicate the proper orientation and sequence of each image. The software populates a volumetric data structure with data from the scanned images. Interpolation may be used to increase the resolution of the data structure. The system is not susceptible to errors which might be caused by images of the sensors being inverted or mis-aligned before or during scanning.

U.S. Pat. No. 6,770,487 to Crosby discloses diagnostic test devices, including diagnostic strip tests, in which identifying information and the test result are machine-readable. Also provided are methods for obtaining identifying information and test results from the diagnostic test devices.

U.S. Pat. No. 6,717,154 to Black et al. discloses methods for quantifying the irradiation dose received by an item or items, such as food items and medical items, undergoing irradiation-based sterilization. Included is the step of monitoring a selected electronic parameter associated with an economic single use sensor positioned adjacent the item or items and telemetrically relaying data associated with the monitored electronic parameter to a computer. The computer includes a computer program which is configured to determine the radiation dose received by the item or items by correlating the value of the monitored electronic parameter to a corresponding amount of radiation associated with the value. Related sensors and systems are also described.

U.S. Pat. No. 6,716,393 to Lappe et al. describes a system for automatically testing a fluid specimen, e.g., urine, to indicate the presence of specified chemical components in the specimen. The system preferably utilizes an assaying device comprised of a collection cup and a cap which carries at least one test strip. The device includes an integrated aliquot delivery mechanism actuatable to wet the test strip with an aliquot delivered from the fluid specimen. The assaying device is configured to operate in conjunction with an electronic reader device capable of actuating the aliquot delivery mechanism and reading the reaction of the test strip. A preferred reader device defines a keyed receptacle for accommodating a complimentary shaped cup housing in a particular orientation. The reader device is comprised of a camera for capturing the image of a test strip, an actuator for actuating an aliquot delivery mechanism, and a microprocessor/controller for controlling the camera and actuator and for processing the image.

U.S. Pat. No. 6,713,298 to McDevitt et al. describes a system for the rapid characterization of multi-analyte fluids including a light source, a sensor array, and a detector. The sensor array is formed from a supporting member into which a plurality of cavities may be formed. A series of chemically sensitive particles are positioned within the cavities. The particles may be configured to produce a signal when a receptor coupled to the particle interacts with the analyte. Using pattern recognition techniques, the analytes within a multi-analyte fluid may be characterized.

U.S. Pat. No. 6,685,094 to Cameron discloses a bar code incorporating thermochromic materials in selected modules such that its code changes with temperature. Below a specified temperature, the bar code displays a first code. Above this temperature, the bar code displays a second code. The bar code is printed with conventional printing equipment onto conventional printing media, and is scanned with conventional bar code scanning equipment.

U.S. Pat. No. 6,545,705 to Sigel et al. discloses a line scan digital camera directed at a station for recording and displaying a time-sequential scene. The digital camera takes a sequence of digital image frames representative of one or more bodies crossing a plane in space, wherein each frame represents a line image of the body, thus forming a fractional part of the scene, and the set of time-successive frames forms a recognizable image on an external display. Within the camera, frames enter a buffer and a microprocessor in the camera compares blocks from successive line images to detect changes indicative of objects entering or leaving the field of view. The changes detected by pixel or block analysis identify information-containing portions of the data stream and their time of occurrence. When the start or end of an object is detected the microprocessor flags the image stream with the detected data to produce an image data stream which can be more readily received and used by the external race management system, or the processor operates a controller in the camera which passes the active portion of the image information data stream to the output port, producing a more compact data stream with no loss of information.

U.S. Pat. No. 6,488,890 to Kirckof discloses a sterilization indicator having sterilizing agent sensitive indicia. The indicator allows a sterilization cycle to be monitored without the need for a user to subjectively distinguish between color, quality or intensity of display patterns.

U.S. Pat. No. 5,408,535 to Howard, III et al. describes a video test strip reader using a video imager or camera for viewing a viewing field containing reagent test strips each having test pads reacted with a specimen containing constituents of interest. The video imager produces an analog signal representing an image of the viewing field. An image handler coupled to the video imager converts or digitizes the analog signal into a digital signal representing the image and stores the image in the form of an array of pixels representing the image. Each pixel contains color information broken down into red, green or blue (RGB). A processor coupled to the image handler analyzes the array of pixels, determines the location and orientation of a test strip, identifies the test areas on the test strip, measures the corresponding test areas on the strip at the proper times and calculates the test results, such as the concentration of the constituents of interest in the specimen or other measurable properties of the specimen, such as color or specific gravity, etc. Accordingly, the video test strip reader can simultaneously locate, color analyze and time track multiple test strips on the viewing field.

In spite of the myriad of test procedures the art still lacks a general purpose high accuracy dosimeter reader for determination of a treatment condition, based on comparison of an image of treated dosimeter with a series of images of pre-treated dosimeter. The art also lacks a dosimeter device which changes color upon treatment with certain materials, such as toxic gases and processes, ionizing radiation and sterilization is pre-treated, imaged with an imaging device, such as CCD camera and images of the dosimeter or the changes, e.g., color change, are stored in an information storage device and where a treatment condition is determined by comparing an image of treated dosimeter with a series of pre-treated images of the dosimeter using a software.

BRIEF DESCRIPTION OF THE DRAWINGS

FIG. 1 illustrates pieces of sensing strips irradiated at different dosages (left) and SIRAD card before and after irradiation with 0.4 Gy (40 rads) of 100 KeV X-ray.

FIG. 8 illustrates a basic block diagram of the reader system.

FIG. 9 illustrates a schematic presentation of one of the optical system for illumination of the card and a CCD camera FIG. 10 illustrates a schematic presentation of comparison of an image read with a CCD camera with pre-treated images of a sensing strip.

FIG. 11 illustrates a block diagram for a basic reader.

FIG. 12 illustrates a schematic presentation of a possible design of the card reader.

FIG. 13 illustrates a representative card reader of the preset invention.

SUMMARY

It is an object of the present invention to provide a general purpose high accuracy dosimeter reader for determination of an exposure based on comparison of a digital image of treated dosimeter with a series of digital images of pre-treated dosimeter. A dosimeter device which changes color upon treatment with certain materials, such as toxic gases and processes, such as ionizing radiation and sterilization is pre-treated, imaged with an imaging device, such as CCD camera and images of the dosimeter or the changes, e.g., color change, are stored in an information storage device. The treatment condition is determined by comparing a digital image of treated dosimeter with a series of pre-treated digital images of the dosimeter using software. The closest match of the treated dosimeter with the pre-treated and pre-imaged dosimeter would indicate the dose from which treatment conditions can be prescribed. The process and device can be used for almost any indicating device, process and treatment.

It is also an object of the invention to correct colors of the treated image for variations in illumination conditions and position by correcting the colors of a color reference chart of the treated image with that of pre-treated images stored in the computer.

It is a further object of the invention to provide a dosimeter processing system capable of processing a dosimeter utilizing full image scanning.

It is a further object of the invention to read the radiation exposure of a system or device which develops color and/or change color upon exposure to high energy radiation such UV, X-ray, electrons and neutrons.

Figure 2:
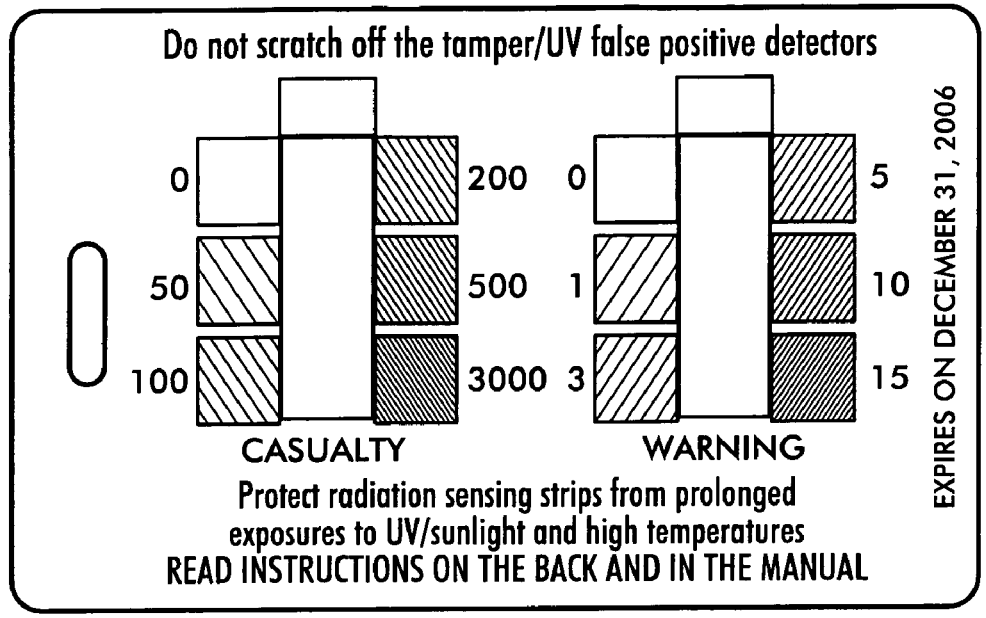
FIG. 2 is a schematic presentation of a dual sensor SIRAD card.

The devices, components, parts, processes and techniques presented here are particularly suitable for use with a self-indicating Instant Radiation Alert Dosimeter (SIRAD) shown for examples in FIGS. 1 and 2. The invention can be used for any other similar indicators, devices and systems. The SIRAD technology is described in many patents and patent applications, including Patent application number WO 2004/077097 and WO 2004/017095 and references cited therein.

It is a further object of this invention to provide a device which is self correcting for any change in conditions during reading such as a change in illumination, reading, positioning of the dosimeter system, and the like.

It is a further object of this invention to provide a device which is self correcting for any abuse or false positive and false negative indications by detecting and reading the abuses, tamper, false positive and false negative indications.

It is a further object of this invention to monitor radiation exposure automatically and accurately and eliminate human and instrumental errors.

It is further object of this invention to develop a system that is user friendly and accurate.

These and other advantages, as will be realized, are provided in a dosimeter reading system. The dosimeter reading system has comprising a dosimeter with an indicator having a sample density which is correlated to a dose of exposure. A holder is provided for holding the dosimeter. An illuminating system is provided for illuminating the sample density on the dosimeter. An imaging system measures the sample density. A control is provided with multiple test densities wherein each test density of the multiple test densities corresponds to a known dose of exposure. A comparator is provided for comparing the sample density to determine a closest test density to the sample density. An output device is provided which is capable of reporting the known dose of radiation exposure corresponding to the closest test density.

Yet another embodiment is provided in a process for measuring an actual dose of exposure. The process includes:
providing a dosimeter capable of changing density proportional to the exposure thereby recording a sample density;
providing a control with multiple test densities wherein each test density of the multiple test densities corresponds to a known dose of exposure;
illuminating the sample density;
measuring the sample density;
comparing the sample density to the multiple test densities to determine a closest test density to the sample density;
calculating the actual dose of exposure from the known dose of exposure corresponding to the closest test density; and
reporting the actual dose of exposure.

DETAILED DESCRIPTION

The present invention is related to a dosimeter reading system for monitoring radiation. The system is particularly adapted for use with automated image reading and comparator systems to increase accuracy, reliability and efficiency.

Exemplary embodiments are described with reference to the various figures.

A sample sensing strip and SIRAD card are illustrated in FIG. 1. In FIG. 1, a sensing strip irradiated at various dosages is illustrated on the left. Each dose has associated therewith a block the optical density of which is correlated to the dosage. The sample is illustrated as shades of grey, however, the actual samples may be shades of blue or another color. The sensing strip would be a control sample. A SIRAD badge is illustrated in FIG. 1 on the right side. The top badge, or card, is unirradiated whereas the bottom card is irradiated at 0.4 Gy, or 40 rads. The central band of the top badge is approximately the same shade of grey as the box labeled "0" at the top center of the card indicating no detectable radiation exposure. The lower badge, or card, has a density which is approximately equal to the density of the box labeled "40" indicated approximately 40 rads of radiation dose. The sensing strip and lower right badge were exposed with 100 KeV X-radiation.

A dual sensor SIRAD card is illustrated in FIG. 2. In FIG. 2, the SIRAD card has two separate regions of detection. The region on the right labeled "WARNING" detects lower levels of radiation wherein the central rectangle would be a shade corresponding to one of the preprinted boxes if exposed to radiation. Above about 50 units (preferably rads) the central region on the right would become saturated and the central rectangular region on the left, labeled "CASUALTY" would begin to darken in relation to the degree of radiation exposure. The shade could be visually correlated to the densities preprinted boxes to determine the approximate dosage. A box directly above each central rectangular region is a tamper/UV false positive detector. In the event of an indication of exposure the opaque cover can be removed from these regions to determine if the density in the central rectangular regions is the result of exposure to UV or some other interfering exposure which would artificially increase the density in the rectangular regions. The card could also have a tamper indicator as shown in our U.S. Provisional Patent Appl. No. 60/790,100 filed Apr. 8, 2006 titled Time-Temperature, UV Exposure and Temperature Indicator for monitoring false positive, false negative, archiving, over exposure to temperature and exposure to UV or sunlight. This indicator can also be placed on the sensors.

Figure 3:
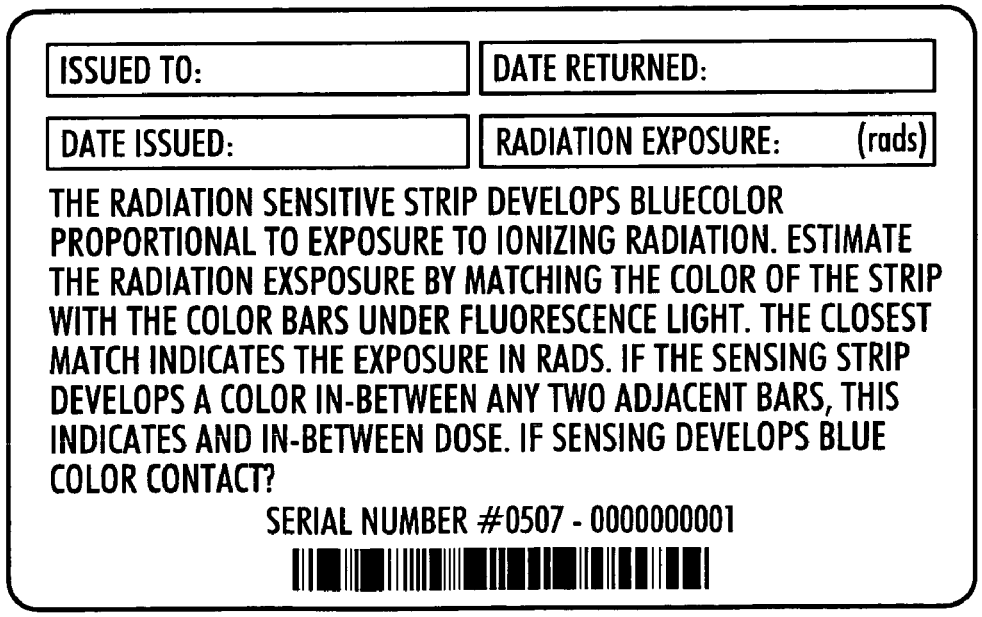
FIG. 3 illustrates an example of the back of the card.

A representative card back is illustrated schematically in FIG. 3. In FIG. 3, text is provided to illustrate the use, a bar code is illustrated for control purposes and regions are provided for entering pertinent information. The back surface could have a magnetic strip, electronic strip or a RFID (radio frequency identification tag (not shown).

Figure 4:
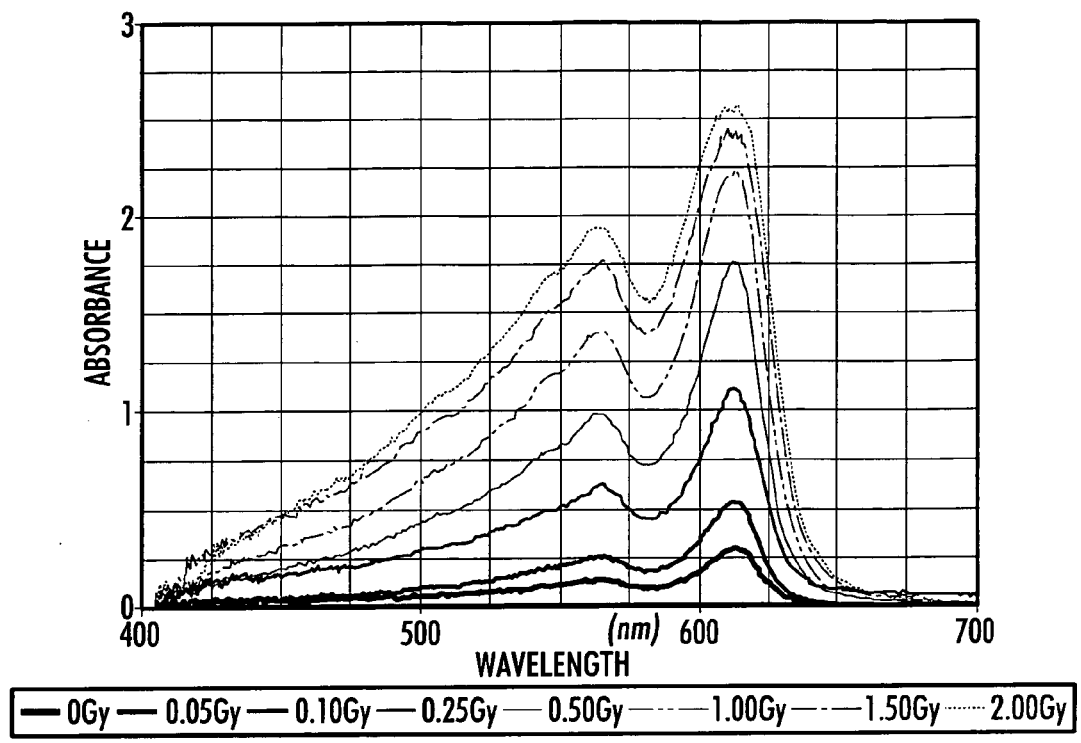
FIG. 4 illustrates the visible spectra of a sensing strip of SIRAD irradiated at different dosage of X-ray.

Visible spectra of a sensing strip of SIRAD irradiated at different dosages of X-ray are illustrated in FIG. 4. The spectra could be stored in a computer as a standard upon which sample SIRAD badges could be compared to determine the optical density and radiation dosage represented thereby.

Figure 5:
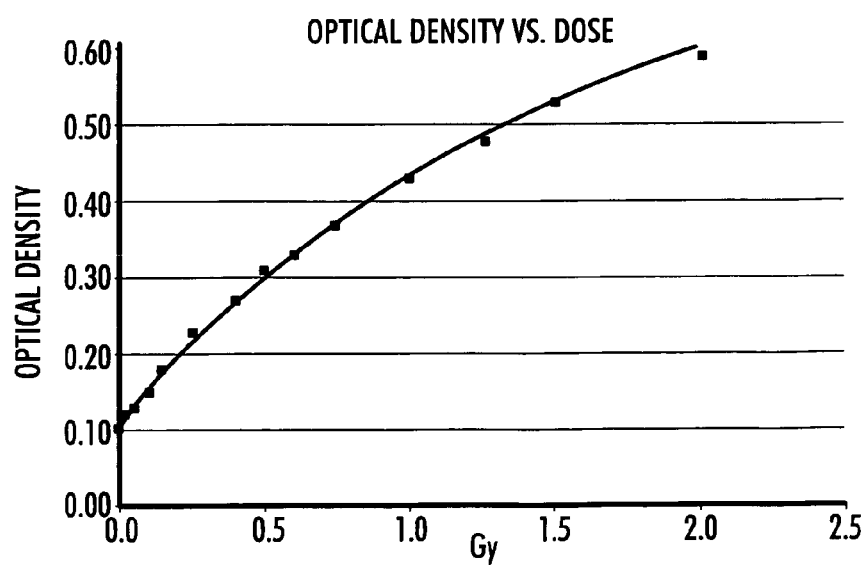
FIG. 5 illustrates a plot of optical density (OD) versus dose from FIG. 4.

A chart of optical density versus dosage from FIG. 4 is illustrated in FIG. 5. The optical density curve could be entered into a data base as a control with which a sample SIRAD could be compared to determine the radiation dosage by measuring and comparing optical density. The data could be in the form of a mathematical equation corresponding to the curve, as a lookup table or other techniques for storing a control in a computer database.

Figure 6:
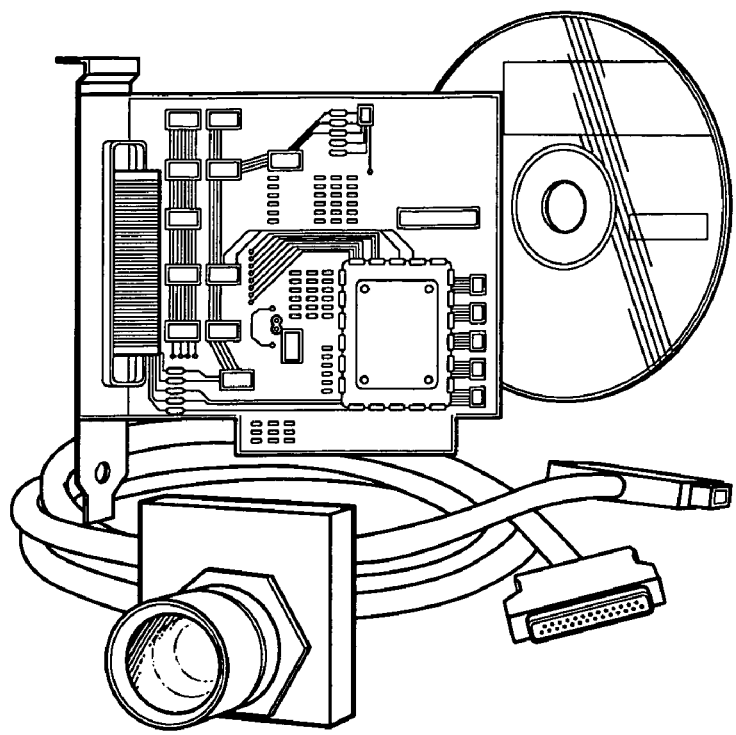
FIG. 6 illustrates a photo of a CCD camera, an image capture board and a software CD.

A CCD camera, image capture board and software CD are illustrated in FIG. 6. One skilled in the art would be able to configure a system as described herein.

Figure 7:
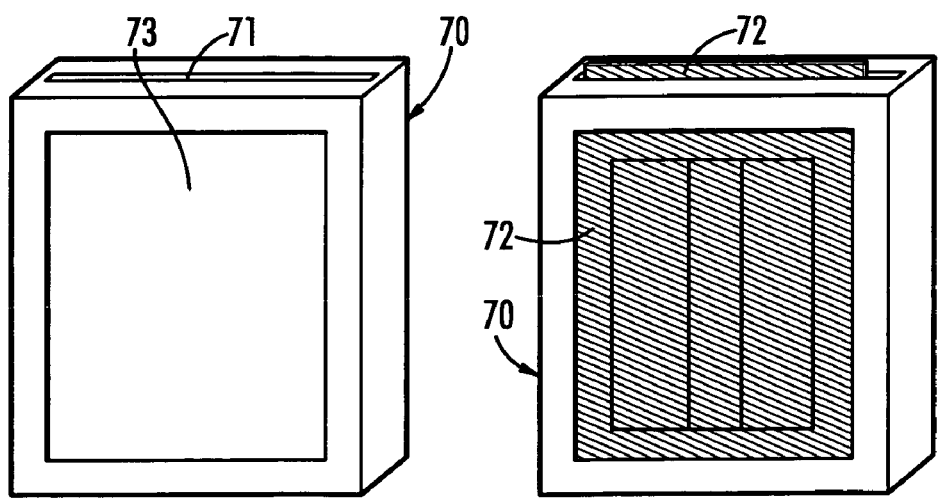
FIG. 7 illustrates a schematic presentation of an example of a holder with and without the dosimeter.

A holder for the SIRAD is illustrated in FIG. 7. In FIG. 7 the holder, 70, comprises a top slot, 71, wherein a SIRAD card, or badge, 72, is entered into the interior of the holder. The holder on the left is illustrated as being empty whereas the one on the right has a badge, 72, entered therein. The holder is preferably configured to have a predetermined orientation and spacing from the camera (not shown) to minimize error. In use, a control card with known densities may be entered first, recorded as a standard and removed. The data obtained is stored for some period of time. The sample card is then entered and read with the optical densities compared to the standard for determination of dosage. A window, 73, is provided. The window is transparent to the imaging system employed.

A block diagram of a reader system of the present invention is illustrated in FIG. 8. The system generally represented at 80, comprises a holder, 81, wherein the sample, 83, to be tested is placed. An illumination system, 82, is situated to uniformly illuminate the sample in the holder. An imager, 84, is situated to read the sample in the holder. A computer, 85, and display system, 86, are in communication, or integral to, the imager. The reader may be in a common case, 87, or components may be separate.

A block diagram of a reader system is illustrated at 90 in FIG. 9 wherein a holder, 91, illuminator, 92, and CCD camera, 93, are illustrated. In the embodiment of FIG. 9 the camera and illuminator are in a case, 94.

FIG. 10 illustrates graphically the process of comparison of a read image with a stored image. The density of the read image is determined and compared with the series of stored images. In the example of FIG. 10 the stored image comprises discreet levels and the dose would be reported as a range or extrapolated between discrete levels.

The reader would have software supporting all above mentioned functions. The block diagram of a card reader is shown on FIG. 11. In FIG. 11, a LED-detector, 110, reads the color density of a control sensing strip, 111. A LED, 112, illuminates the sensing strip. Because reflectivity of the colored strip is proportional to the color density, the electrical signal developed by the LED-detector correlates to the dose. It is preferred for the reader to be calibrated for zero reading (reflectivity of un-exposed strip). A second LED-detector, 113, reads the color density of a sample strip, 114, illuminated by a second LED, 115. A common power supply, 116, can be used for both LED's and in fact this is preferred since it insures consistent illumination on each strip. Even more preferred is a single LED strip exposing both the sample strip and the sensing strip. A comparator, 123, compares the densities of the two strips. A power supply, 116, provides power as needed. A processor, 117, converts density to dose of exposure. The processor has associated therewith a memory device, 118. The results can be output to an output device, 119, or a communication device, 121. The output device has associated therewith an output driver, 119, and the communication device has associated therewith a communication device driver, 122. The output device can be a monitor, a printer or a storage device which is optionally accessed at a later date or which can provide the input for a summarized report. The communication device is any device which allows the reader to communicate with another device and may include a USB port, a modem, or any communication link commonly employed between digital devices.

The control sensing strip is preferably read prior to, or simultaneously with, the reading of the dosimeter. In one embodiment a control sensing strip is read, the data is stored digitally and at least one dosimeter strip, and preferably multiple dosimeter strips, are read and compared to the stored digital data. This method is referred to as sequential. The control sensing strip may be reread as needed to insure proper calibration. In another embodiment a control strip is read simultaneously with the dosimeter. This method is referred to as simultaneous. With the direct method there is no requirement to store a digital data set representative of the control strip even though this is not precluded.

The electrical signals developed by both detectors enter the comparator, which develops "0" signal/dose. This signal enters the processor establishing "0" level. The sensing strip material is preferably calibrated in a lab by gradual X-ray exposures to obtain the calibration table representing reflectivity as a function of radiation exposure, which is loaded in the processor memory. The processor compares the data obtained from the detector with data loaded in the processor memory and displays the computed dose. This reading is translated on the illuminated LCD screen of the card reader.

FIG. 12 shows a schematic presentation of a card reader in top cut-away view and front view. In FIG. 12 the card reader, generally represented at 1200, receives a SIRAD card, 1201, therein. The SIRID card comprises a barcode, 1202, and a sensing strip, 1203. The sensing strip is read by a detector, 1204, such as an LED detector couple and the information is forwarded to an electronic unit, 1205. The bar code is preferably read by a second LED detector couple, 1206, with the information forwarded to the electronic unit. The electronic unit reports the data to an output device, 1207, such as an LCD screen. A communication device, 1208, such as a USB port provides connectivity to other devices. A power source, 1209, such as a lithium battery, provides power. Contact switches, 1210, can be used to insure that the card is properly placed in the holder. The contact switches preferably prohibit the measurement of density unless the card is in a proper position as indicated by the contact switch being activated. A case, 1211, is preferably provided wherein certain components are interior, or integral, to the case and other components are outside of the case. The choice of which components are interior to the case and which are integral or exterior is primarily based on aesthetics, convenience and utility and does not limit the invention.

In order to read a radiation exposure, the card is inserted in the card reader. The CCD camera takes the picture and sends it, preferably in real time, to the computers that process the picture.

A representative card reader is illustrated in FIG. 13.

Figure 14:
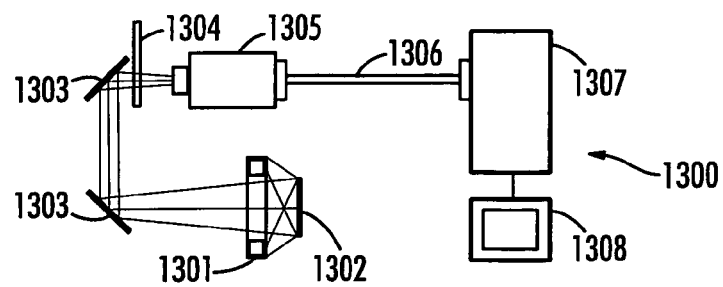
FIG. 14 illustrates a schematic block diagram of a CCD-camera reader with mirrors and filters.

FIG. 14 illustrates a schematic representation of a reader system of the present invention. In FIG. 14 the card reader, 1300, comprises LED bars, 1301, which illuminate the SIRAD card, 1302. Mirrors, 1303, redirect the image to a CCD camera, 1305, if necessary for space considerations. Optional filters, 1304, can be incorporated to alter the signal. A communication link, 1306, such as a cable, connects the reader to a computer, 1307, which, in turn, is in communication with an output device, 1308, such as a monitor.

Figure 15:
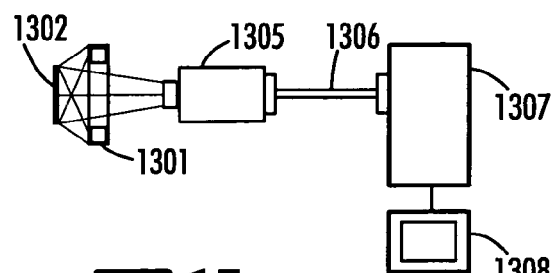
FIG. 15 illustrates a schematic block diagram of a CCD-camera reader without mirrors and filters.

FIG. 15 illustrates an alternative embodiment of the reader system wherein the mirror and filters are not incorporated into the reader.

Figure 16:
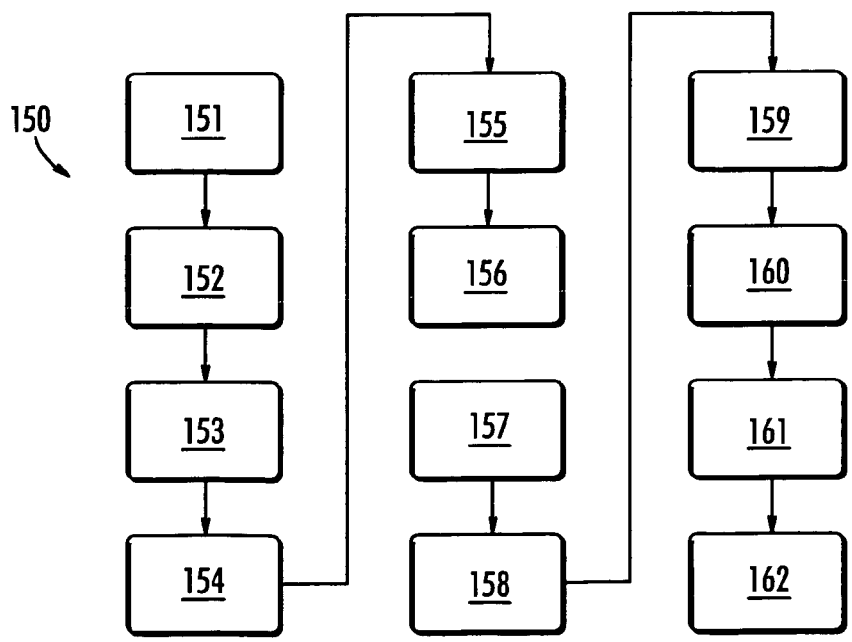
FIG. 16 is a flow chart illustrating the process of implementing the present invention.

The process for using the system will be described with reference FIG. 16 as used to determine dosage to X-ray exposure. In FIG. 16, the process is generally represented by a flow chart at 150. The reader is prepared, 151, by connecting and positioning its components/hardware. The computer of the reader is loaded, 152, with all software. The computer is loaded with dosimeter identification data, 153, including dosimeter identification, manufacturing and expiration dates, which software to use, e.g., for color reference chart, location of sensing strip, other indicators and positioning references etc. The computer is then loaded with digitized images, 154, either still images or videos, of the dosimeter pre-treated, and exposed to different dosages of X-ray. A database is established, 155, correlating dosage to image characteristics. A sample dosimeter to be read is placed in the holder, 156. The sample dosimeter is illuminated, 175, preferably with the illumination system. The CCD camera images the dosimeter, 158. The software identifies the dosimeter and then corrects the digital image of the dosimeter for illumination conditions and position, 159. The software determines which files are to be used for determination of dose. The software compares the digital image, 160, preferably pixel-by-pixel with color/spectral resolution, of the sensing strip of the dosimeter with that of the series of videoed digitized images of the dosimeter exposed to different dosages of radiation. Based on the image or a series of closely identical images of the pre-treated dosimeter matching that of the treated dosimeter and corresponding treatment condition, the dose, or dose range, is determined, 162. The dose or dose range and other required information is displayed, 162, preferably on a monitor or a printed medium. The reader system may have an extra sensor to read information from a magnetic strip, an electronic chip or radio frequency identification tag.

The dosimeter of the present invention, referred to as SIRAD, in addition to the sensing strip, may include additional information and components. The dosimeter may have product identification numbers. The product identification numbers may be alpha numerics and may include digital information, barcodes or a similar system for identifying the dosimeter, e.g., magnetic strip, electronic chip or RFID. Particular identifiers may include product information, such as date of manufacturing, a code for calibrating images and charts to be used, an expiration date, individual card numbers, other information such as instructions for use and point of contact, color reference bars, sensing strip(s) and other indicators such as false positive, false negative, archiving and shelf life expiration indicators.

The dosimeter may have reference lines, dots or markings for reading the rest of the card. The reference lines, dots or markings may indicate the location of sensing strip(s), the location of color reference bars or the location of false positive indicators.

Information may be recorded on one side or both sides of the dosimeter. The dosimeter could be a small dot to a large card. It could also be very rigid or flexible. The preferred size is that of a credit card, shape, strength and material. The dosimeter may have a protective cover.

One of the components of the reader is preferably a holder for the dosimeter. The holder may have a window for positioning and illuminating desired area of the dosimeter for imaging with a CCD camera. The size of the window will depend on size and opacity of the dosimeter and object. The holder preferably has a slot to insert and position the dosimeter into or a holder to position the dosimeter in the window. The dosimeter may be held in place with vacuum, springs or similar devices and processes. The holder may have a sensor for correct positioning of the card and may include an alarm or signal to indicate improper positioning. The holder may have a self inserting device which can pick up each card from a stack and position it at the window of the holder. It is preferable that the surface of the card can be cleaned by wiping.

One or more components of the reader can be mounted on a base. The base could be a metal, wood or plastic.

Ambient light conditions can be used under certain circumstances, it is preferable to have a light source dedicated to illuminate the card to insure consistent illumination and light color spectrum. The system may have a light source which illuminates the card through the window of the card holder. The light system may be a simple lamp, a flash light, a wide area photodiode, laser, an array of LED's (light emitting diode) and the like. The light source may have an optics (lens/mirrors/reflectors) system for uniform illumination of the card in the window. The light source should be properly positioned to minimize glare and other undesirable effects.

The card is preferably read with an imaging system. The imaging system may be an optical densitometer, spectrophotometer, scanner or CCD camera. The preferred system is a CCD camera and an optical scanner with a CCD camera being most preferred.

A computer is preferably interfaced with the reader wherein the computer receives the image from the reader. The computer preferably has a comparator for comparing sample images with stored images, a storage device, an input device and an output device.

It is preferred to have a calibration procedure for the camera and comparator. The calibration data can be stored in the computer and may comprise pre-scanned images, optical densities, colors and color intensity and spectra.

Standard commercially available programs for correlating the product ID, processing data, image comparison, data interpretation, and data archiving can be used.

The output devices may include printers and monitors.

The reader may optionally have a device to transmit the data/results either on line and/or on wireless/cell system.

It is preferred to have a data base including identification data, calibration data, indicators, and other effects.

The indication data would be for identification and information for reading the card. They will include information on (1) Special identification numbers and barcodes, magnetic strip or a computer chip, (2) Product identification number, such as date of manufacturing (3) Codes for calibration images and charts to be used (4) Expiration date (5) Individual card number and (6) Other information, such as info on color reference bars, location of sensing strip(s) and false positive indicators.

There are several ways for establishing calibration data and estimation of dose or for quantification of the exposure. If the reader determines optical density or spectra of the sensing strip, a data base can be created by determining optical density or spectra of the sensing strip pre-treated with different exposures/treatments/doses. Data can be stored from an original video while being exposed/treated using a CCD type camera. Preferred method and data for preparing calibration data is to prepare a digital video of the dosimeter pre-treated to the maximum treatment. Whole video or selected portions of the video can be used as calibration data.

The indicators or dosimeter may be in form of a strip or card which is properly positionable on the holder or its window. Indicating formulations can be in form of tiny dots to any size and shape.

Any other corrections, such as effect of temperature, glare, color, substrate, batch-to-batch variations, spectral shift due to temperature and dose (if any), baseline shift, etc can be automatically made by comparing image of the color reference chart of treated dosimeter with that of pre-treated dosimeter. As the colors of color reference chart do not change with treatment, they can be used for making corrections for illumination and position.

The scanning device or the reader may be, for example, a CCD imaging camera or an optical imaging device. Optical system of CCD camera may include an optics (lens/mirrors/reflectors) system for sharp imaging of the dosimeter. The CCD sensor/camera will receive reflected light and converts an image contained in the treated dosimeter into an electrical signal for processing and analysis. Camera would read a whole card, i.e., color intensity of the sensor strip, bar codes, color reference charts/bars and all other information. The reader may have two cameras one to read the front of the card while the other to read the back of the card, if required.

The card may have other indicators, such as false positive indicators and shelf life expiration indicators. The camera can scan these and other indicators to determine contribution from false positives, tempering and remaining shelf life.

The sensor may have more than one indicator of the same or different classes. The sensor may include a radiation sensor for UV, X-ray, electrons, neutrons, protons or alpha particles; a sterilization sensor for ethylene oxide, steam, dry heat, plasma, oxidants, aldehydes, radiation and the like; a perishables sensor for time, time temperature, temperature, freeze, thaw, humidity/moisture, sterilization, doneness of microwave foods and the like; a biological agents sensor for anthrax, ebola, plague, smallpox and the like; a chemical agents sensor for cyanide, phosgene, nerve agents, vesicants, organics, inorganics and the like; a toxic gases sensor for chlorine, fluorine, chlorine dioxide, ethylene oxide, hydrogen peroxide, ozone, isocyanates, hydrogen cyanide, hydrogen fluoride, hydrogen sulfide, sulfur dioxide, ammonia, amines, acids, etc.; or a bio-chemicals sensor for components of blood, urine, saliva, etc.

It is preferred that the dosimeter undergo color change proportional to the dosage. The color change may be a gradual color development or intensification; a gradual color fading; a gradual color change or an abrupt color change.

The dosimeter could include a color developing or intensifying wherein the color develops and intensifies with treatment; a colorless-to-blue transition; a colorless-to-red transition; a color fading transition; a blue-to-colorless transition or a red-to-colorless transition. The color changing can be blue-to-red or red-to-blue. The dosimeter may also undergo a spectrum shifting transition such as red to orange to yellow to yellow-green to green to blue-green to blue, the reverse or any subset thereof. The color change could be gradual or fast. The color change also could be a change in fluorescence. For certain processes, such as temperature, the color change could be reversible as well The sensor could be a coating on a substrate. The substrate of the dosimeter could be transparent, translucent or opaque. The substrate could be of any shape and size. The size of the sensor could be a tiny (e.g., 0.5 mm$^2$) or as large as needed.

If the sensors are transparent they can be read in transmission and waveguide modes. If they are opaque or applied on an opaque substrate, they can be read in reflectance mode. The reflectance mode is the preferred mode.

CCD cameras and associated software/hardware are used for many applications such as in agricultural for grading lumber & produce, and aerial surveys; in medical applications such as remote radiology and video modalities; in manufacturing applications such as for product inspection, process control and quality control; in research such as in mechanical & chemical engineering, physics, astronomy, biology, oceanography and fluid flow dynamics; in industry such as in motion analysis, remote diagnosis, document processing and other applications such as in graphic arts, security, video editing, video graphics and multi-spectral analysis.

It could be a simulated hardware.

Most industries utilize visual inspection of manufactured products to check for dimensions, surface metrology, visible defects, color, labeling, or correctness of assembly. For "unit" products, such as lenses, light bulb filaments, or integrated circuits, imaging subsystems capture one or more images of each product through area or line scan cameras—including high speed or high resolution, as the application requires.

Imaging subsystems of the reader digitize the resulting signals. Images can be buffered on a single subsystem, and optionally compressed, before being transferred to workstations or mass storage devices. The images can then be digitally enhanced, stored, transmitted, and later viewed on monitors.

After capture of an image of the dosimeter, a high speed on-board signal processor, analog or digital, will execute algorithms that analyze and classify the images according to customer-specific criteria.

A large number of CCD cameras are available commercially. An exemplary model for demonstrating the invention is the Kodak 1310c *camera system. This camera system contains SV*1310 CMOS color camera head, lens mounted with infrared cut filter, data cable, image sensor, D2X1-SV1310c PCI interface board, and XCAP-imaging program. The system can be composed of camera lens system; filters for unwanted radiation, such as UV and infrared; interface, such as a cable; digital frame grabber for video type camera and imaging or image manipulation programming. CMOS sensor camera systems offer the advantages of high resolution progressive scan image capture, low noise digital signaling, small size, convenient software control, the availability of extensive processing, measurement, and analysis capabilities, and low cost. Software provides control of all camera operations. A high resolution camera, such as over 1,000×1,000 pixels is preferred. The color camera dialog would provide automatic white balance as well as manual adjustment of Red, Green, and Blue gain.

An image capture board is typically employed to extract the image. A cable can connect the camera head to the board or the system can be integral. The board would provide power to the camera, send and receive camera control signals, generate the programmable pixel clock, and receive video data.

Imaging programs are also readily available commercially and the choice is not limited herein. The program preferably allows for camera controls, such as exposure, resolution, triggering, color balance and frame rate. In addition, the program preferably provides a camera-to-computer communication, a programmable pixel clock, and exposure times synchronized to AC voltages. Camera-to-computer communication is preferably confirmed by a communication graphic.

Imaging requirement would include acquisition, processing, analysis, storage, transmission, or display of the information. Images would be processed and enhanced by a computer, digital signal processor (DSP), or dedicated circuitry to improve appearance, add graphics, or for combining with other images. Images are preferably analyzed to determine the size, position, and relationship of features. Images are preferably displayed by converting from pixel format to analog images/pictures or they can be printed. Images may be transmitted through a local area network (LAN), an intranet or the internet as well known in the art for access at remote locations. Systems may include camera or scanner, lighting, imaging board, computer, display, and software.

SIRAD card is developed for monitoring exposure to radiation. The card has at least one sensing strip which changes color when exposed to high energy radiation. The color density of the radiated card directly correlates to the radiation dose. The reading of dose by human by comparing with a color reference chart may not be accurate. Hence a reader is needed for reading the exposure with better accuracy and precision. Moreover, colors could be read differently in different illumination conditions (daylight, incandescent light, etc.) and by different people. The reading may require documentation. Hence, an electronic card reader is desired. This can be achieved by many different ways. Two possible designs for reading SIRAD and other similar cards. A basic one is suitable for mass application and field operation where the dose is estimated by reading color intensity (e.g., absorbance or transmission) or optical density of the sensing strip and estimating dose from the pre-calibrated plot or data of optical density versus dose. Alternatively, the entire card can be imaged with a CCD camera and the image can be compared with a pre-recorded video or a series of images stored in a computer using a software.

The card reader can be designed to read just one kind of SIRAD card, for example, a single or dual-sensor SIRAD card. The size of this reader should be as small as possible, e.g., 100 mm×50 mm×20 mm. The main function of the reader is to read the dose, display and temporary store the data. The reader would read and store specific information written on the card, such as card holder ID, card number and expiry date. The reader may have a USB port that could be connected to PC to transmit data stored in temporary memory of the card and if required transmit the data to a central station.

The card reader may have another set of LED-detector couples that can be used to read the barcode written on back or front of SIRAD card. The barcode may contain the card serial number, expiration date, ID of card holder, etc. The barcode is read when the card is being inserted into the slot of the reader.

The card reader may contain a flash memory unit (similar to SC memory stick) and software. The memory unit can preferably store a number of radiation readings together with the card barcode information that can be displayed on the screen or transmitted to PC via USB port installed in the reader.

The USB port provides communication between the reader and PC; therefore, it allows transmitting the data, updating the software and testing the reader.

The reader may have many e.g., five LED-detector couples—two for each strip, where one of them is in optical contact with "0" reading part and another one—with the sensing part of the strip, and another LED-detector couple is used for barcode reading.

The card reader can be a flat box having a slot, in which the SIRAD card is inserted in such a way that the LED-detector couples are positioned against specific parts of the card as described above. The reader may contain the electronic unit (comprising LED-detector couple driver, processor, memory and USB port), illuminated LCD screen, Lithium batteries and two contact switches. When the card is being inserted, the first one switches the power on and starts barcode reading. When the card is fully inserted in the slot, the second switch starts reading the radiation doze.

In a preferred embodiment the card reader has one or two CCD cameras installed in the card reader. In one embodiment the CCD cameras take pictures of both the sides. The CCD cameras are preferably directly connected to a PC via a cable, which connects it to the camera driver installed in the computer. The reader preferably has an illuminator and may have mirrors to reflect the light to the camera. The card reader preferably communicates with a computer in real time. Software processes the data transmitted by the CCD cameras. The data is preferably stored in a PC memory. The software analyzes the data.

The data acquired can also be transmitted automatically or whenever desired with a system similar to phone, internet, cable and cell-phone type devices to a central station.

The present invention has particularly advantageous over the art. The whole sensing area is read so error is minimized and accuracy is increased. A significant increase in accuracy is provided both in lower limit of detection and accurate treatment conditions. The system is a self reading, self correcting and self calibrating reader. The system can read more than one sensor of the dosimeter, including false positive, false negative and shelf life indicators. There is no limit to the shape and sized of the indicator/sensor. Data can be transmitted on line or on wireless system. It is a very fast reader. It simplifies the process of reading the dosimeter. It reads all information, such as product ID, dosimeter number, and all other data on the card. The reader can be made universal for monitoring a number of materials and processes and data transmitted automatically. It is a relatively low cost reader. It can be designed to scan the dosimeter from a distance.

The invention has been described with particular reference to the preferred embodiments without limit thereto. Alternate embodiments are envisioned which are specifically within the metes and bounds of the invention as more specifically set forth in the claims appended hereto.

What is claimed is:

1. A dosimeter reading system comprising:
a dosimeter holder;
a dosimeter which comprises
1) at least one sensor which develops or changes color upon radiation with ionizing radiation;
2) at least one color reference chart having at least one color corresponding to a pretreated sensor,
an illuminating system configured to illuminate the dosimeter;
an imaging system configured to obtain a color image of the dosimeter;
a data processing system adapted to compare the color image of the dosimeter or a portion thereof to a database comprising a multiplicity of calibrated images which have been obtained by pre-treating samples of the dosimeter, wherein each calibrated image is indicative of a different known radiation dosage, or lack thereof; and
a reporting system adapted to report the radiation dosage of the dosimeter.

2. The dosimeter reading system of claim 1 wherein the dosimeter further comprises at least one indicator selected from a group consisting of a tampering indicator, a false positive indicator, a false negative indicator, a shelf life expiration indicator and a temperature indicator.

3. The dosimeter reading system of claim 1 which is self correcting for a variation in the dosimeter reading due to at least one change selected from group consisting of a change in illumination or position of the dosimeter during reading, a change in the color of the sensor due to storage time or expired shelf life, a change due to exposure to higher temperature, a change due to tampering and a change due to exposure to sunlight.

4. The dosimeter reading system of claim 1 wherein the dosimeter has product and user identification information comprised of a barcode, a magnetic strip, an electronic chip or a radiofrequency indicating device (RFID).

5. The dosimeter reading system of claim 1 wherein the imaging system is selected from a CCD camera and a scanner.

6. The dosimeter reading system of claim 1 wherein the illuminating system is comprised of at least one source selected from a lamp, a flash, an LED and a laser.

7. The dosimeter reading system of claim 1 wherein the holder has a window through which the image is obtained.

8. The dosimeter reading system of claim 1 which further comprises a reader configured to read product identification information on the dosimeter.

9. The dosimeter reading system of claim 1 wherein the holder provides a slot for receiving and positioning the dosimeter.

10. The dosimeter reading system of claim 1 wherein the holder further comprises at least one contact that prohibits the system from obtaining an image of the dosimeter unless the dosimeter is in a position to activate said contact.

11. The dosimeter reading system of claim 1 which is comprised of a case that contains at least one of the illuminating system, the imaging system, the data processing system and the reporting system is interior to said case.

12. The dosimeter reading system of claim 1 wherein the radiation is X-radiation, electrons, protons, alpha particles or neutrons.

13. The dosimeter reading system of claim 1 wherein the calibrated images are discrete images.

14. The dosimeter reading system of claim 13 wherein the calibrated image that corresponds to the dosimeter image is a discreet image of the dosimeter.

15. The dosimeter reading system of claim 1 wherein the calibrated images are continuous images of the dosimeter.

16. The dosimeter reading system of claim 1 wherein the reporting system or data processing system is an output device.

17. A process for measuring an actual dose of radiation exposure comprising:
    exposing a color changing or color developing radiation dosimeter to radiation;
    illuminating the dosimeter wherein the dosimeter comprises 1) at least one sensor which develops or changes color upon radiation with ionizing radiation and 2) at least one color reference chart having at least one color corresponding to a pretreated sensor;
    obtaining an image of the dosimeter;
    providing multiple calibrated images of a dosimeter wherein each stored image corresponds to a known dose of exposure;
    comparing the image of the dosimeter to the multiple calibrated images;
    determining a closest calibrated image to the image;
    calculating the actual dose of exposure from the dose of exposure corresponding to the closest calibrated image; and
    reporting the actual dose of exposure.

18. The process of claim 17 further comprising inserting the dosimeter in a holder prior to obtaining an image of the dosimeter.

19. The process of claim 18 wherein the holder comprises a receptacle configured to the dosimeter.

20. The process of claim 18 wherein the holder further comprises at least one contact that prohibits obtaining the image of the dosimeter or comparing the image of the dosimeter to the calibrated images unless the dosimeter is in a position to activate the contact.

21. The process of claim 18 which is comprised of a holder wherein at least one of an illuminating system, an imaging system, a data processing system and a reporting system is interior to said case.

22. The process of claim 18 wherein the holder has a window through which the image of the dosimeter is obtained.

23. The process of claim 18 wherein the illuminating occurs in the holder.

24. The process of claim 17 wherein exposure to radiation is indicated by a change in color of at least one sensor on the dosimeter.

25. The process of claim 17 wherein the image of the dosimeter is obtained using a CCD camera or a scanner.

26. The process of claim 17 wherein the dosimeter is illuminated using at least one illumination source selected from a lamp, a flash, an LED and a laser.

27. The process of claim 17 wherein the step of comparing the image of the dosimeter to the multiple calibrated images includes a step of self-correcting for a change in the illuminating condition or position of the testing dosimeter.

28. The process of claim 17 wherein the step of comparing the image of the dosimeter to the multiple calibrated images includes a step of self-correcting the dosage reading for any effect of shelf life, tampering, temperature, UV light and sunlight on the sensor.

29. The process of claim 17 further comprising reading at least one indicator selected from a tamper indicator, a false positive indicator, a false negative indicator, a shelf life expiration indicator and a temperature indicator.

30. The process of claim 17 further comprising reading an identification device comprising a bar code, a magnetic strip, an electronic chip or an RFID on the dosimeter.

31. The process of claim 17 wherein the calibrated images and the image of the dosimeter are compared simultaneously.

32. The process of claim 17 wherein the calibrated images and the image of the dosimeter are compared sequentially.

33. The process of claim 17 wherein the calibrated image and the image of the dosimeter are compared, corrected and dose is determined.

34. The process of claim 17 the radiation is X-ray, electrons, protons, alpha particles or neutrons.

35. The process of claim 17 wherein the calibrated images are obtained by taking a series of images of a color developing or color changing dosimeter while being radiated.

36. The process of claim 17 wherein the calibrated images are obtained by scanning a series of radiated color developing or color changing dosimeter.

37. The process of claim 17 wherein the calibrated images are created by obtaining a series of images of at least one indicator selected from the group of a tamper indicator, a false positive indicator, a false negative indicator, a shelf life expiration indicator and a temperature indicator while being exposed to radiation, sunlight UV light or a change in temperature.

38. The process of claim 17 wherein the calibrated images are created by scanning an indicator comprising one or more of a tamper indicator, a false positive indicator, a false negative indicator, a shelf life expiration indicator and a temperature indicator while being exposed to radiation, sunlight, UV light or a change in temperature.

* * * * *